(12) United States Patent
Gibbons et al.

(10) Patent No.: US 10,446,284 B2
(45) Date of Patent: Oct. 15, 2019

(54) INSTRUMENTATION CONDUIT HOUSING

(71) Applicant: TerraPower, LLC, Bellevue, WA (US)

(72) Inventors: Peter W. Gibbons, Kennewick, WA (US); P. Harley Park, Bellevue, WA (US)

(73) Assignee: TerraPower, LLC, Bellevue, WA (US)

( * ) Notice: Subject to any disclaimer, the term of this patent is extended or adjusted under 35 U.S.C. 154(b) by 478 days.

(21) Appl. No.: 15/377,601

(22) Filed: Dec. 13, 2016

(65) Prior Publication Data

US 2017/0352441 A1 Dec. 7, 2017

Related U.S. Application Data

(60) Provisional application No. 62/344,121, filed on Jun. 1, 2016.

(51) Int. Cl.
| | |
|---|---|
| *G21C 17/116* | (2006.01) |
| *G21C 1/02* | (2006.01) |
| *G21C 15/02* | (2006.01) |
| *G21C 5/00* | (2006.01) |

(52) U.S. Cl.
CPC .......... *G21C 17/116* (2013.01); *G21C 1/026* (2013.01); *G21C 15/02* (2013.01); *G21C 5/00* (2013.01); *Y02E 30/34* (2013.01)

(58) Field of Classification Search
CPC ...... G21C 17/116; G21C 17/10; G21C 1/026; G21C 1/02; G21C 1/00; G21C 15/02; G21C 15/00; G21C 5/00; G21C 5/02; G21C 5/04; G21Y 2004/30; Y02E 30/34

USPC .............................................. 248/56; 211/26
See application file for complete search history.

(56) References Cited

U.S. PATENT DOCUMENTS 5,271,585 A * 12/1993 Zetena, Jr. ........... G02B 6/4459
174/95
2018/0144834 A1* 5/2018 Lebedev ................ G21C 1/022

OTHER PUBLICATIONS

Yoo et al., "Overall System Description and Safety Characteristics of Prototype Gen IV Sodium Cooled Fast Reactor in Korea" Nuclear Engineering and Technology (Aug. 2016).
Hahn et al., "Conceptual Design of the Sodium-Cooled Fast Reactor Kalimer-600" Nuclear Engineering and Technology 39(3) (Jun. 2007).

* cited by examiner

*Primary Examiner* — Nkeisha Smith (57) ABSTRACT

A conduit housing includes a top face, a pair of side faces disposed opposite each other and adjacent to the top face, a front side, and a rear side. The top face includes a plurality of vertical conduit ports arranged in a plurality of rows. The front side is positioned between the pair of side faces and defines a plurality of stepped faces. The rear side is disposed opposite the front side and adjacent the top face. The stepped faces include a plurality of downward faces and each of the plurality of downward faces defines a downward face plane. The stepped faces also include a plurality of upward faces, where each of the plurality of upward faces defines an upward face plane. Each upward face includes a plurality of pitched conduit ports.

9 Claims, 7 Drawing Sheets

INSTRUMENTATION CONDUIT HOUSING

INTRODUCTION

Nuclear fission reactors include breed-and-burn fast reactors (also referred to as traveling wave reactors, or TWRs). TWR means a reactor that would be designed to operate indefinitely using natural uranium, depleted uranium, spent light water reactor fuel, or thorium as a reload fuel after start up, and in which waves that breed and then burn would travel relative to the fuel. Thus, in some aspects, the TWR is a once-through fast reactor that runs on subcritical reload fuel which is bred up to a useful state and burned in situ. In a TWR, a wave of breeding and fissioning (a "breed-burn wave") is originated in a central core of the reactor and moves relative to the fuel. In cases where the fuel is stationary, the breed and burn wave expands outward from the ignition point. In some cases, the fuel may be moved so that the breed and burn wave stays stationary relative to the core (e.g., a standing wave) but moves relative to the fuel; a standing wave is to be considered a type of TWR. Movement of fuel assemblies is referred to as "fuel shuffling" and can accomplish the standing wave, adjustment to reactor characteristics (heat, flux, power, fuel burn up, etc.). The central core in which the fuel assemblies are shuffled is disposed in a reactor vessel. The fuel assemblies include fissile nuclear fuel assemblies and fertile nuclear fuel assemblies. Reactivity control assemblies may also be disposed in the central core for adjustment of reactor characteristics.

Fission energy defined by the standing wave creates thermal energy which is transferred in series through one or more primary coolant loops and intermediate coolant loops to steam generators to produce electricity, and low temperature heat is rejected through a set of water-cooled vacuum condensers. The separation of coolant systems into both primary and intermediate coolant loops helps maintain the integrity of the core and the primary coolant loops. In the TWR, both the primary and intermediate coolant loops utilize liquid sodium as the coolant.

SUMMARY

A conduit housing is disclosed. In one aspect, a conduit housing includes a top face, a pair of side faces, and a front side. The top face includes a plurality of vertical conduit ports arranged in a plurality of rows. The pair of side faces are disposed opposite each other and adjacent to the top face. The front side is positioned between the pair of side faces and defining a plurality of stepped faces. The stepped faces include a plurality of downward faces, where each of the plurality of downward faces defining a downward face plane. The stepped faces also include a plurality of upward faces, where each of the plurality of upward faces defining an upward face plane. Each upward face includes a plurality of pitched conduit ports. The conduit housing also includes a rear side disposed opposite the front side and adjacent the top face.

Optionally, the number of vertical conduit ports alternate between even and odd on adjacent rows. Also, optionally, the vertical conduit ports are evenly spaced and offset from adjacent rows. Optionally, the number of pitched conduit ports alternates between even and odd on adjacent upward faces. Optionally, the pitched conduit ports are evenly spaced and offset on adjacent upward faces.

In rear side may also define a plurality of secondary stepped faces. The secondary stepped faces include a plurality of secondary downward faces, each of the plurality of secondary downward faces defining a downward face plane, and where each downward face plane is parallel to an adjacent downward face plane. The stepped faces include a plurality of secondary upward faces, each of the plurality of secondary upward faces defining an upward face plane, and where each upward face plane is parallel to an adjacent upward face plane. Also, each upward face includes a plurality of secondary pitched conduit ports.

Optionally, a portion of a plurality of conduits are positioned within the housing and each of the plurality of conduits is connected to a vertical conduit port or a pitched conduit port. Optionally, the conduits are configured to exit the housing in a direction opposite the top face. Optionally, each downward face plane is parallel to an adjacent downward face plane and each upward face plane is parallel to an adjacent upward face plane.

BRIEF DESCRIPTION OF THE DRAWINGS

The following drawing figures, which form a part of this application, are illustrative of described technology and are not meant to limit the scope of the invention as claimed in any manner, which scope shall be based on the claims appended hereto.

DETAILED DESCRIPTION

Figure 1:
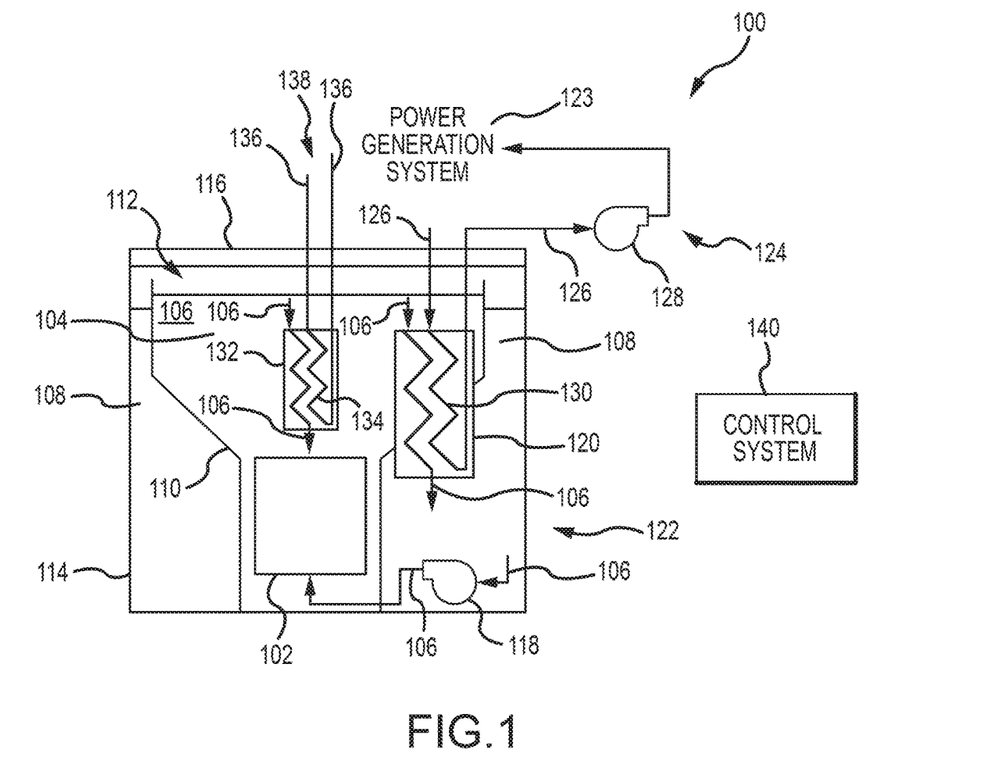
FIG. 1 illustrates, in a block diagram form, some of the basic components of a TWR reactor.

FIG. 1 illustrates, in a block diagram form, some of the basic components of a travelling wave reactor (TWR) 100. In general, the TWR 100 includes a reactor core 102 containing a plurality of fuel assemblies (not shown). The core 102 is disposed at the lowest position within a pool 104 holding a volume of liquid sodium coolant 106. The pool 104 is referred to as a hot pool and has a sodium temperature higher than that of a surrounding cold pool 108 (due to the energy generated by the fuel assemblies in the reactor core 102), which also contains liquid sodium coolant 106. The hot pool 104 is separated from the cold pool 108 by an inner vessel 110. An optional headspace 112 above the level of the sodium coolant 106 may be filled with an inert cover gas, such as argon. A containment vessel 114 surrounds the reactor core 102, hot pool 104, and cold pool 108, and is sealed with a reactor head 116. The reactor head 116 provides various access points into the interior of the containment vessel 114.

The size of the reactor core 102 is selected based on a number of factors, including the characteristics of the fuel, desired power generation, available reactor 100 space, and so on. Various embodiments of a TWR may be used in low power (around 300 $MW_e$-around 500 $MW_e$), medium power (around 500 $MW_e$-around 1000 $MW_e$), and large power (around 1000 $MW_e$ and above) applications, as required or desired. The performance of the reactor 100 may be improved by providing one or more reflectors, not shown, around the core 102 to reflect neutrons back into the core 102.

The sodium coolant 106 is circulated within the vessel 114 via a primary sodium coolant pump 118. The primary coolant pump 118 draws sodium coolant 106 from the cold pool 108 and injects it into the hot pool 104, proximate (e.g., below) the reactor core 102, where the coolant 106 is heated due to the reactions taking place within the reactor core 102. A portion of the heated coolant 106 enters an intermediate heat exchanger 120 from an upper portion of the hot pool 104, and exits the intermediate heat exchanger 120 at a location in the cold pool 108. This primary coolant loop 122 thus circulates sodium coolant 106 entirely within the reactor vessel 114.

The intermediate heat exchanger 120 also includes liquid sodium coolant and acts as a barrier between the primary coolant loop 122 and a power generation system 123, so the integrity of the core 102 and primary coolant loop 122 can be ensured. The intermediate heat exchanger 120 transfers heat from the primary coolant loop 122 (fully contained within the vessel 114) to an intermediate coolant loop 124 (that is only partially located within the vessel 114). The intermediate heat exchanger 120 passes through an opening in the inner vessel 110, thus bridging the hot pool 104 and the cold pool 108 (so as to allow flow of sodium 106 in the primary coolant loop 122 therebetween). In an embodiment, four intermediate heat exchangers 120 are distributed within the vessel 114.

The intermediate coolant loop 124 circulates sodium coolant 126 that passes through pipes into and out of the vessel 114, via the reactor head 116. An intermediate sodium pump 128 located outside of the reactor vessel 114 circulates the sodium coolant 126. Heat is transferred from the sodium coolant 106 of the primary coolant loop 122 to the sodium coolant 126 of the intermediate coolant loop 124 in the intermediate heat exchanger 120. The sodium coolant 126 of the intermediate coolant loop 124 passes through a plurality of tubes 130 within the intermediate heat exchanger 120. These tubes 130 keep separate the sodium coolant 106 of the primary coolant loop 122 from the sodium coolant 126 of the intermediate coolant loop 124, while transferring heat energy therebetween.

A direct heat exchanger 132 extends into the hot pool 104 and provides additional cooling to the sodium coolant 106 within the primary coolant loop 122. The direct heat exchanger 132 is configured to allow sodium coolant 106 to enter and exit the heat exchanger 132 from the hot pool 104. The direct heat exchanger 132 has a similar construction to the intermediate heat exchanger 120, where tubes 134 keep separate the sodium coolant 106 of the primary coolant loop 122 from a sodium coolant 136 of a direct reactor coolant loop 138, while transferring heat energy therebetween.

Other ancillary reactor components (both within and outside of the reactor vessel 114) include, but are not limited to, pumps, check valves, shutoff valves, flanges, drain tanks, etc., that are not depicted but would be apparent to a person of skill in the art. Additional penetrations through the reactor head 116 (e.g., a port for the primary coolant pump 118, inert cover gas and inspection ports, sodium processing ports, etc.) are not depicted. A control system 140 is utilized to control and monitor the various components of the reactor 100.

Figure 3A:
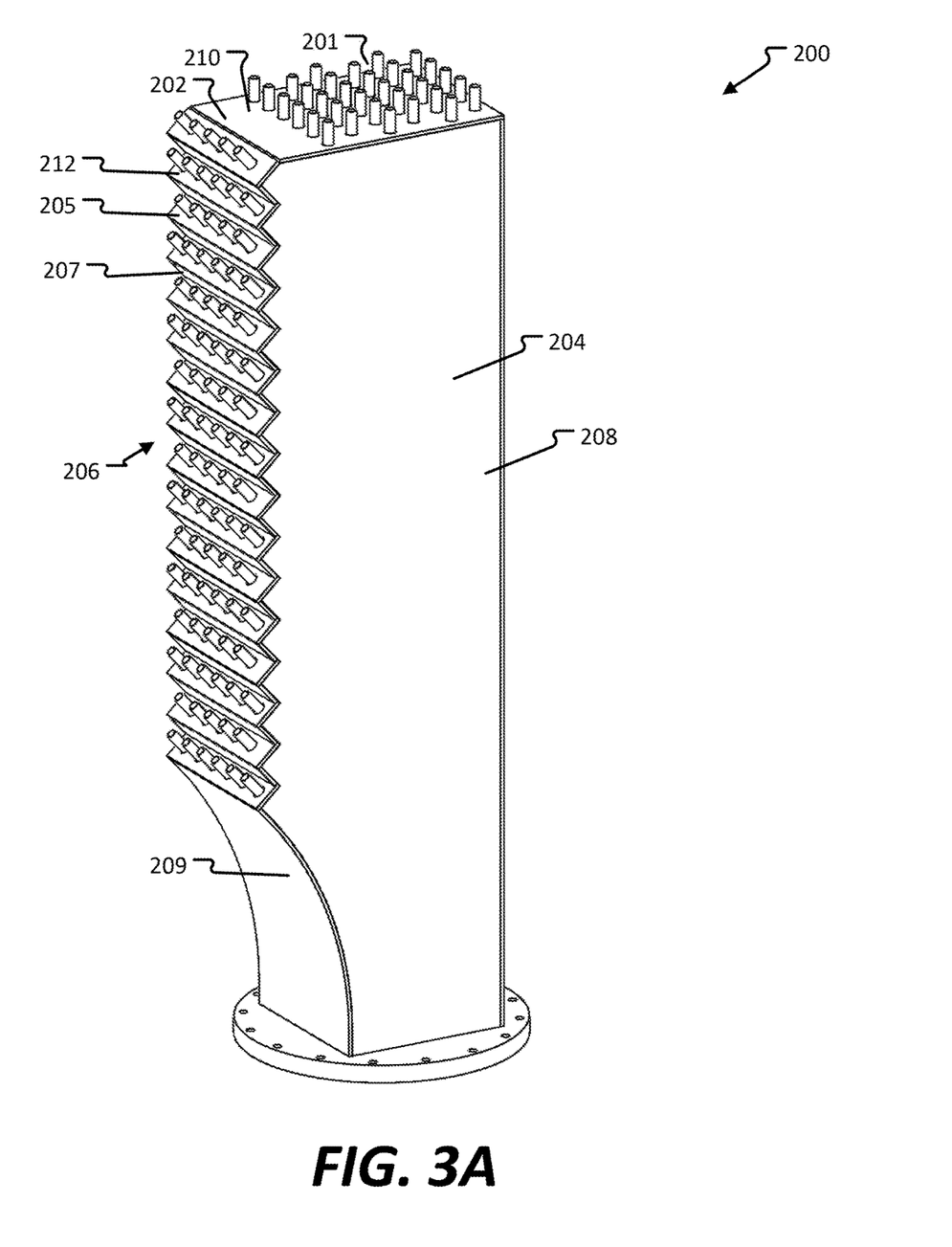
FIGS. 3A-D are various views of an example of an instrumentation conduit housing.

Broadly speaking, this disclosure describes configurations that improve the performance of the reactor 100 described in FIG. 1. Specifically, embodiments, configurations, and arrangements of instrumentation conduit housings positioned on the reactor head 116 are shown and described in more detail below with reference to FIGS. 3A-4.

Figure 2:
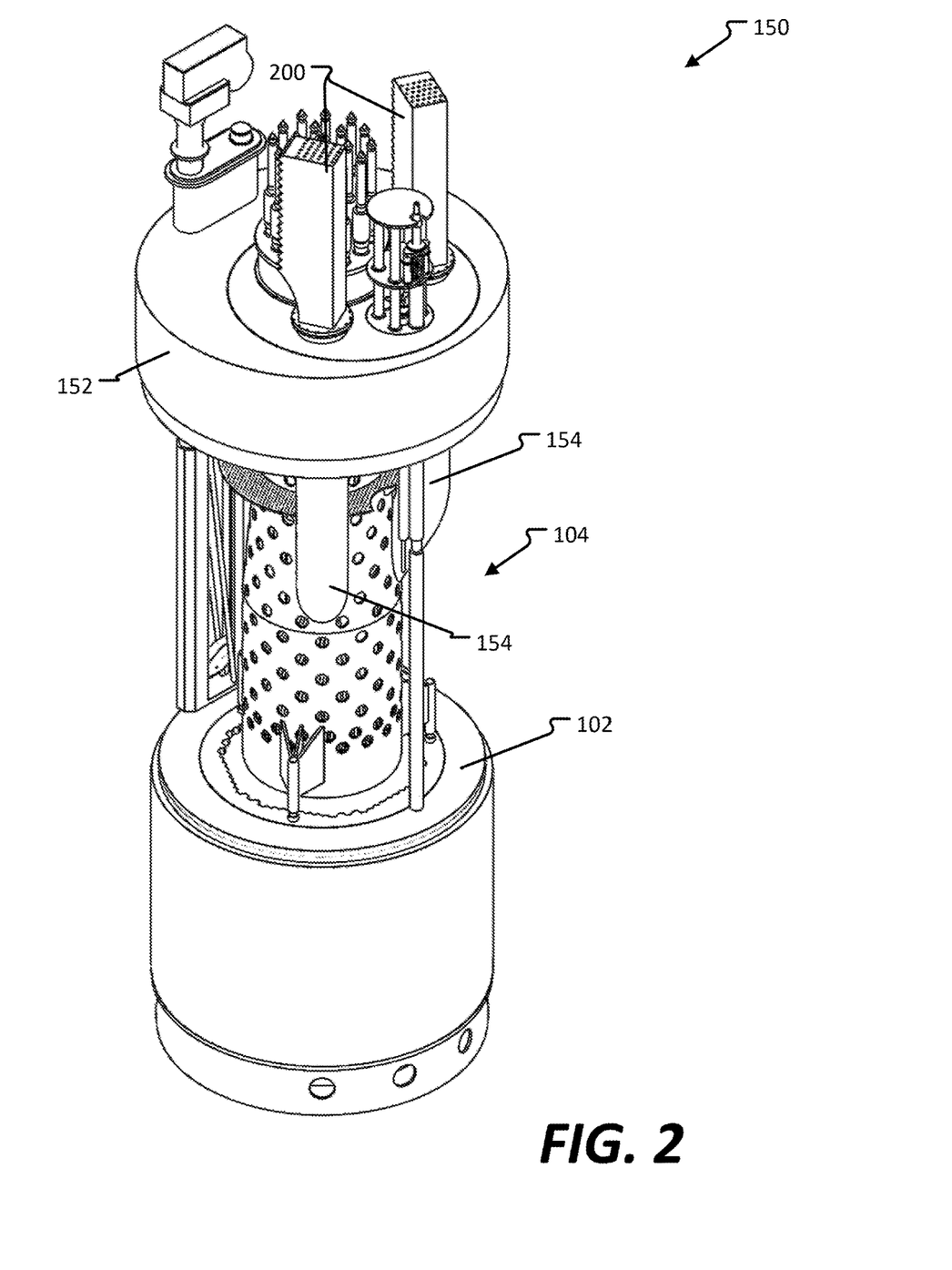
FIG. 2 is a partial perspective view of a reactor core of a TWR reactor and access and control mechanisms related thereto.

FIG. 2 is a partial perspective view of a reactor core of a TWR reactor 150 and access and control mechanism related thereto. Two instrumentation conduit housings 200 are positioned on a rotating plug assembly 152 that is disposed within the reactor head (not shown). Conduits extend from the conduit housing 200, through the plug assembly 152, and into the hot pool 104 of the reactor 150. The conduits are not depicted, but pass through a collector duct 154 (are associated with each instrumentation conduit housing 200). The conduits terminate above the reactor core. Instrumentation capable of monitoring various reactor parameters, such as temperature and flow rate, are inserted into the conduits and positioned proximate the core 102. Such instrumentation may include sensors, wires, probes, combinations thereof, and so on, as required or desired for particular purposes.

Generally, the instrumentation conduit housing 200 supports the conduits and also provides direct access to each conduit for instrumentation access. Each conduit is associated with a specific active fuel position in the reactor core. A fitting, not shown, may be used to secure the conduit to the surface of the housing 200. The fitting limits the movement of the conduits relative to the housing 200 and seals the inner space of the housing. Further, the portion of the conduits passing through the fitting may be sealed.

The ports conduits may be staggered on multiple faces of the conduit housing 200, which decreases the required size of the housing 200. Each conduit has a minimum bend radius, which is about 1.5 meters in the embodiments shown in FIGS. 3A-4. Such a bend radius is required to allow instrumentations or other elements to be inserted into the conduits and fed therethrough down without binding, into the reactor core. Thus, the upward staggered faces enable access to the conduits while maximizing the bend of the conduit, especially as compared to ports that would be positioned on a planar, vertical side face, or on a downward staggered face.

Ports located on a top surface of the housing 200 minimizes the height of the conduit housing 200. That is, without ports on the top surface, the conduit housing 200 would need to include additional stepped faces to provide ports for every conduit, thereby adding height to the conduit housing 200. As an example, in the embodiments shown, the conduit housing 200 would require six more stepped faces to accommodate all the conduits. Adding height to the conduit housing is generally undesirable because of seismic considerations and ease of access.

Additionally, the alternating positioning of the ports further enhances access to the conduits and maximizes spatial utilization within the housing, which also decreases the size of the conduit housing 200. In the embodiments shown, there are 235 active fuel positions and two conduit housings 200, each having 121 conduit ports. Thus, there are seven more conduit ports than active fuel positions. In other embodiments, there is one conduit for each active fuel position in the reactor core. Other quantities of conduit ports and active fuel positions are possible.

Further, the number of ports in subsequent rows alternates between two values (although more or less can be contemplated in different embodiments). However, the number may be the same between one or more adjacent rows in other embodiments. Regardless, the relative positioning of the conduit ports is such that each adjacent row is offset from the one or more adjacent rows.

Figure 3B:
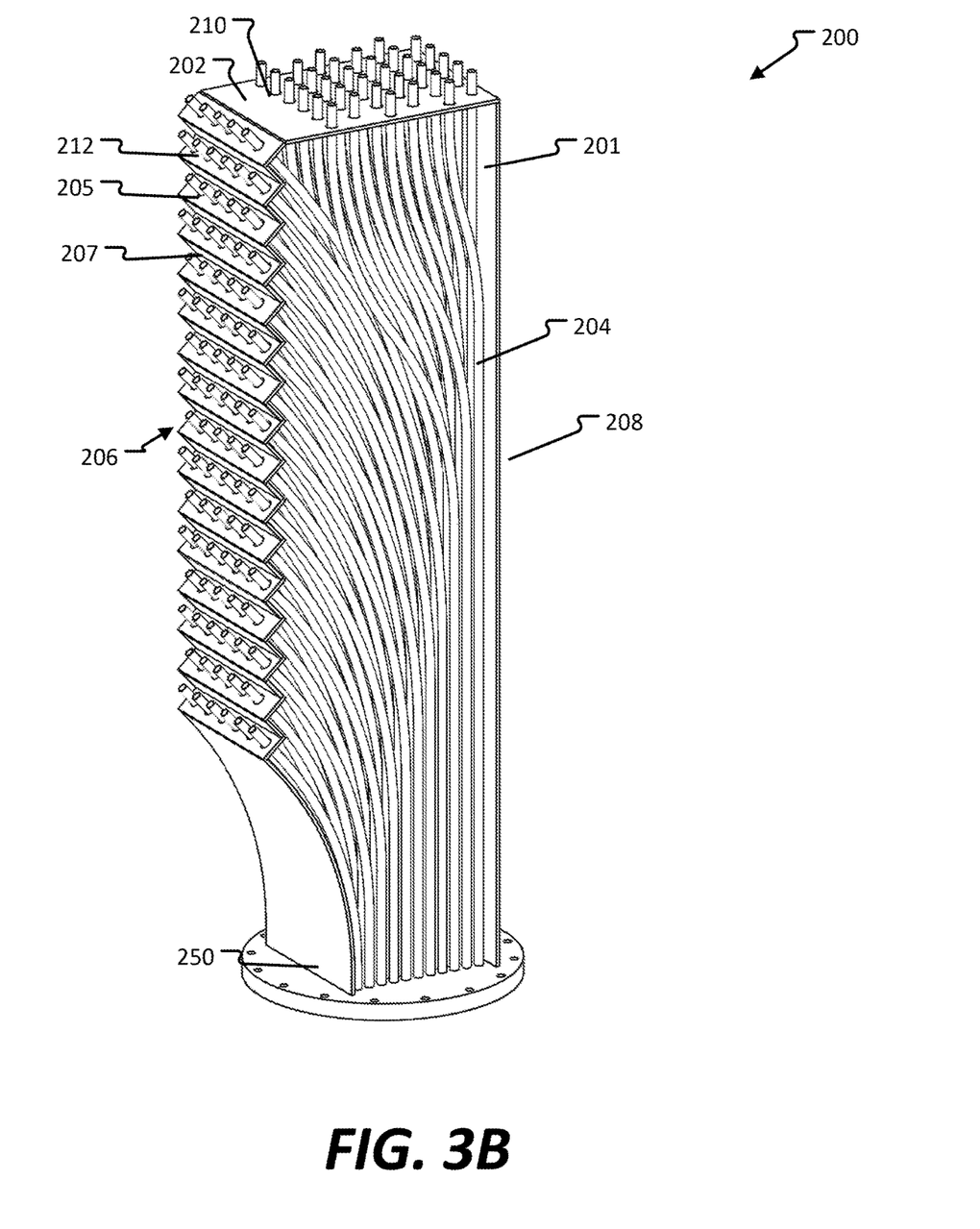
Figure 3C:
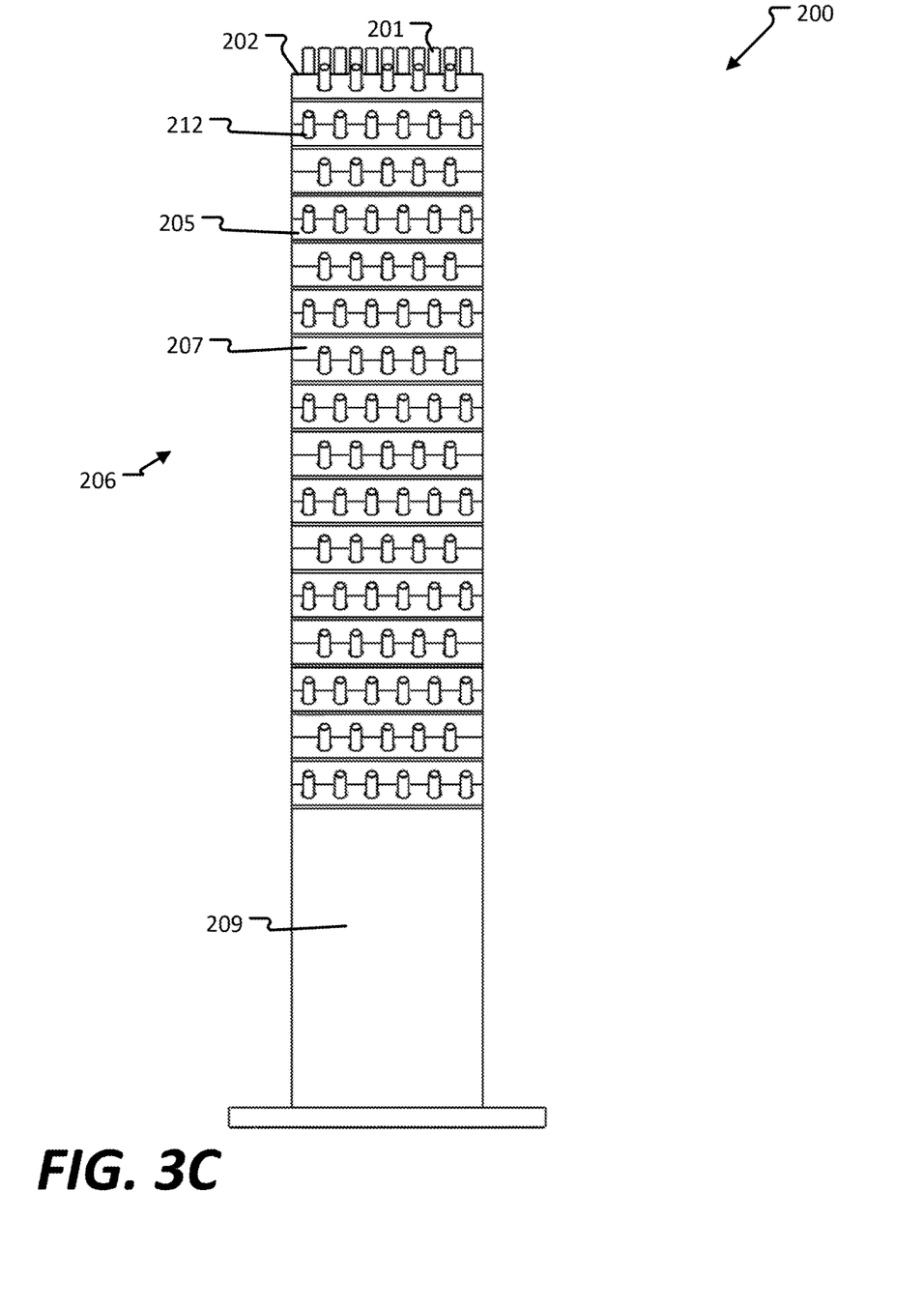

FIGS. 3A-3D show an example embodiment of an instrumentation conduit housing 200. In FIG. 3B, outer surfaces of the instrumentation conduit housing 200 are depicted transparent to show the conduits 201 therein. The conduit housing 200 includes a top face 202, a pair of side faces 204, a front face 206, and a rear face 208. In the embodiment shown, the top face 202 and the front face 206 define a plurality of 210, 212 conduit ports. Any number of vertical conduit ports 210, 212 may be utilized.

The front face 206 includes a plurality of stepped faces 205 and 207, as well as a curved lower portion 209. The stepped faces include a plurality of upward faces 205 and a plurality of downward faces 207. Each upward face 205 is substantially planar and parallel to the other upward faces 205. Similarly, each downward face 207 is substantially planar and parallel to the other downward faces 207. Additionally, each upward face 205 is substantially normal to the adjacent downward faces 207. In other embodiments, the upward 205 and downward 207 faces may intersect at non-normal angles.

The upward faces 205 include pitched conduit ports 212. The number of pitched conduit ports 212 may alternate on adjacent upward faces 205. That is, one upward face may have five pitched conduit ports while an adjacent upward face may have six pitched conduit ports, and so on. Additionally, the pitched conduit ports 212 in adjacent upward faces 205 are aligned in an offset fashion, such that the pitched conduit ports 212 are aligned in every other upward face 205. The number of ports on adjacent or subsequent upward faces may vary as appropriate.

The top face 202 defines vertical conduit ports 210 that may be set back a distance D from the top-most upward face 205. This distance provides spacing for the conduits that are curving from the top-most upward face 205 downward toward the reactor head. The top face 202 defines a plurality of rows of vertical conduit ports 210. The rows of vertical conduit ports 210 may alternate between an even number of vertical conduit ports 210 and an odd number of vertical conduit ports 210. As shown, the rows alternate between having five and six vertical conduit ports 210 in each row.

Additionally, each row of vertical conduit ports 210 is offset from adjacent rows. Thus, vertical conduit ports 210 in every other row are aligned and have the same number of vertical conduit ports 210. Having an offset alignment facilitates the efficient use of space within the conduit housing 200 as well as provides space for tools, such as wrenches, to be used to tighten nuts, swage locks, or other securing members to the conduit housing 200. The curved lower portion 209 of the front face 206 accommodates the bend radius of the conduits 201. Thus, any upward faces defining ports in the curved lower portion 209 would require the conduits to bend more than their design tolerances (as required to allow passage of an instrumentation inserted therein). The curved lower portion 209 minimizes the footprint of the housing 200 on the reactor head. In other embodiments with different bend radius specifications, the curved lower portion 209 may be smaller or larger.

Figure 3D:
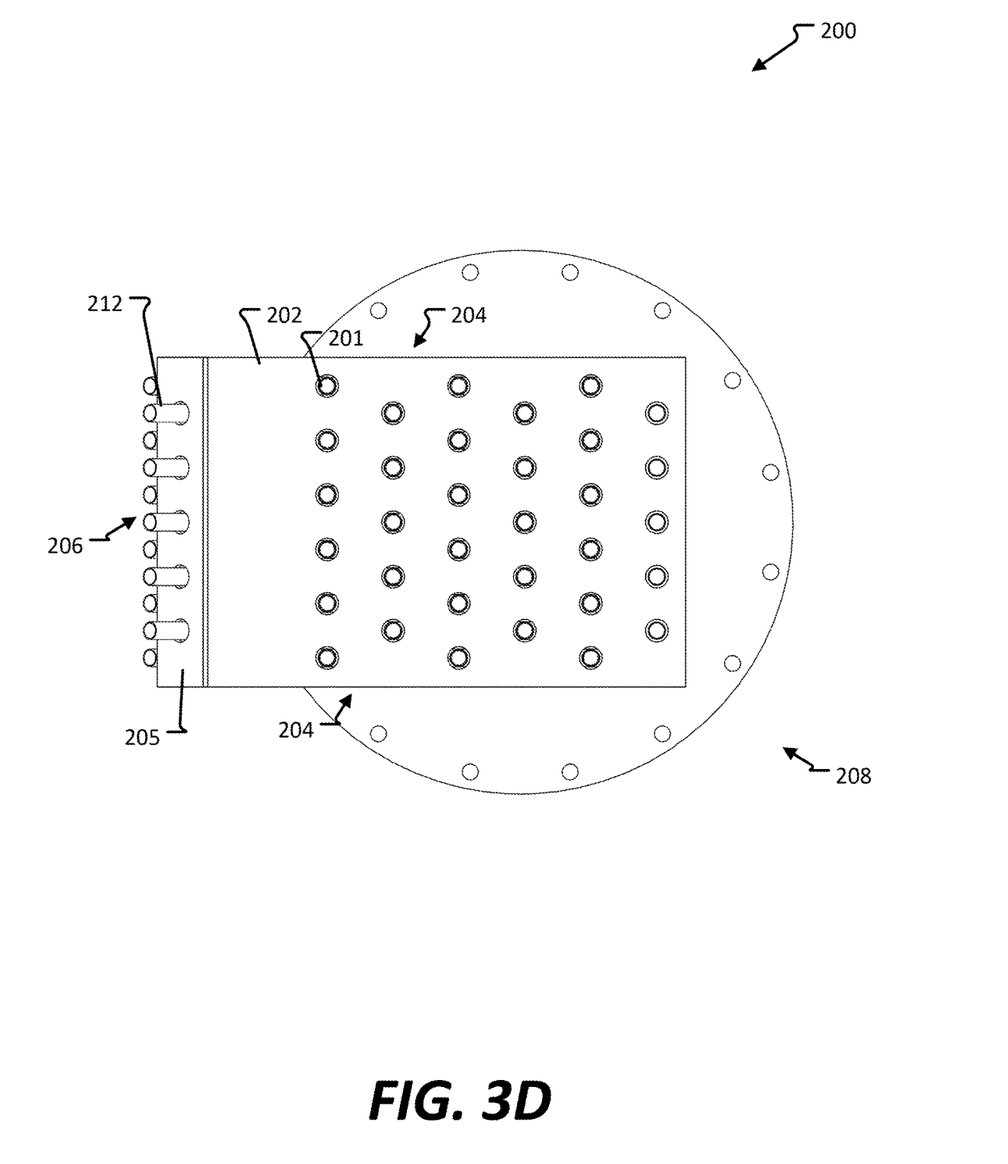

Conduits 201 are specifically shown through transparent surfaces on FIGS. 3B and 3D. For clarity, only some of the conduits 210 are depicted. Each terminates at a single one of ports 210 or ports 212, which may be scaled. In examples, each conduit 201 may be sealed against its associated surface. The conduits 201 exit the conduit housing 200 through openings 250 and pass into the interior of the reactor.

In an example, after the conduits exit the conduit housing 200, they may be twisted to prevent a direct line of radiation into the housing. Alternatively or additionally, a plurality of steel balls may be positioned proximate the exit point of the conduits so as to refract the radiation.

Figure 4:
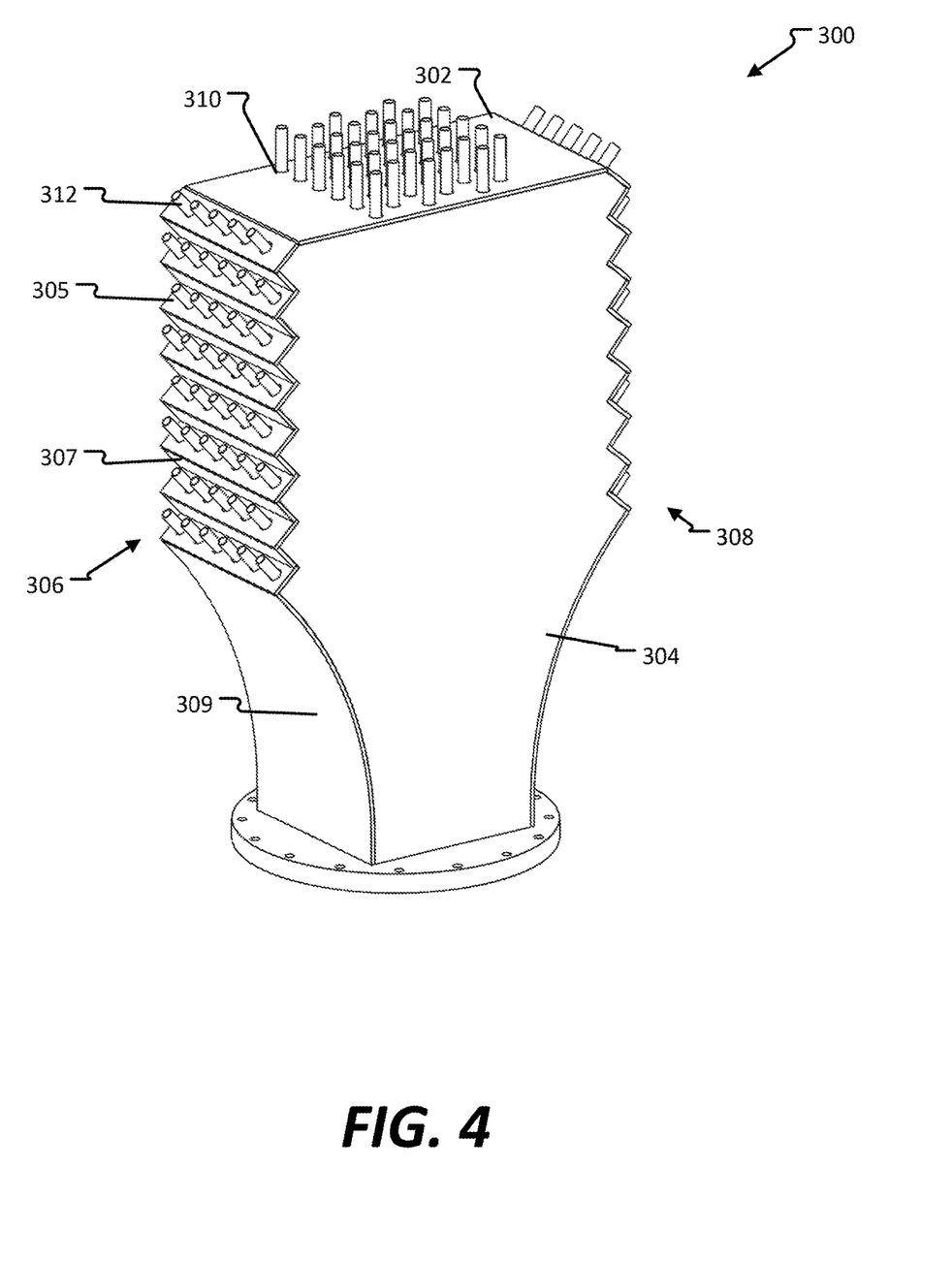
FIG. 4 is another example of an instrumentation conduit housing.

FIG. 4 is a perspective view of a second embodiment of a conduit housing 300. The second embodiment 300 has pitched conduit ports 312 on a front face 306 and on a rear face 308, with side faces 304 positioned therebetween. The front face 306 and the rear face 336 are similarly sized and configured, with the same number of upward faces 305, downward faces 307, and congruent curved portions 309. The pitched conduit ports 312 are arranged similarly on the upward faces 305 of the front face 306 and the rear face 336. The top face 302 includes rows of vertical conduit ports 310.

It is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting. It must be noted that, as used in this specification, the singular forms "a," "an," and "the" include plural referents unless the context clearly dictates otherwise.

It will be clear that the systems and methods described herein are well adapted to attain the ends and advantages mentioned as well as those inherent therein. Those skilled in the art will recognize that the methods and systems within this specification may be implemented in many manners and as such is not to be limited by the foregoing exemplified embodiments and examples. In this regard, any number of the features of the different embodiments described herein may be combined into one single embodiment and alternate embodiments having fewer than or more than all of the features herein described are possible.

While various embodiments have been described for purposes of this disclosure, various changes and modifications may be made which are well within the scope contemplated by the present disclosure. Numerous other changes may be made which will readily suggest themselves to those skilled in the art and which are encompassed in the spirit of the disclosure.

What is claimed is:

1. A conduit housing, comprising:
   a top face including a plurality of vertical conduit ports arranged in a plurality of rows;
   a pair of side faces disposed opposite each other and adjacent to the top face;
   a front side positioned between the pair of side faces and defining a plurality of stepped faces,
     wherein the stepped faces include a plurality of downward faces, each of the plurality of downward faces defining a downward face plane;
     wherein the stepped faces include a plurality of upward faces, each of the plurality of upward faces defining an upward face plane;
     wherein each upward face includes a plurality of pitched conduit ports; and a rear side disposed opposite the front side and adjacent the top face.

2. The conduit housing of claim 1, wherein the number of vertical conduit ports alternate between even and odd on adjacent rows.

3. The conduit housing of claim 2, wherein the vertical conduit ports are evenly spaced and offset from adjacent rows.

4. The conduit housing of claim 3, wherein the number of pitched conduit ports alternates between even and odd on adjacent upward faces.

5. The conduit housing of claim 4, wherein the pitched conduit ports are evenly spaced and offset on adjacent upward faces.

6. The conduit housing of claim 1, wherein the rear side defines a plurality of secondary stepped faces,
   wherein the secondary stepped faces include a plurality of secondary downward faces, each of the plurality of secondary downward faces defining a downward face plane, wherein each downward face plane is parallel to an adjacent downward face plane;

wherein the stepped faces include a plurality of secondary upward faces, each of the plurality of secondary upward faces defining an upward face plane, wherein each upward face plane is parallel to an adjacent upward face plane; and wherein each upward face includes a plurality of secondary pitched conduit ports.

7. The conduit housing of claim 1, wherein a portion of a plurality of conduits are positioned within the housing, and wherein each of the plurality of conduits is connected to a vertical conduit port or a pitched conduit port.

8. The conduit housing of claim 7, wherein the conduits are configured to exit the housing in a direction opposite the top face.

9. The conduit housing of claim 1, wherein each downward face plane is parallel to an adjacent downward face plane; and wherein each upward face plane is parallel to an adjacent upward face plane.

\* \* \* \* \*